3,516,791
MICROPOROUS CARBON PREPARATION
Brian Evans, Rhondda, Wales, and Edward A. Flood, Ottawa, Ontario, Canada, assignors to Canadian Patents and Development Limited, Ottawa, Ontario, Canada, a corporation of Canada
No Drawing. Filed Oct. 5, 1967, Ser. No. 673,013
Int. Cl. C01b 31/02
U.S. Cl. 23—209.1          9 Claims

ABSTRACT OF THE DISCLOSURE

Carbons having adsorptive and molecular sieve properties prepared from halogenated vinylic hydrocarbon polymers (e.g. polyvinylidene chloride and fluoride) by contacting with a liquid ammonia solution of an amide of an alkali metal.

---

This invention concerns microporous carbons having adsorbent and molecular sieve properties, and a process of preparation from halogenated vinylic hydrocarbon polymers such as polyvinylidene chloride (PVC) or fluoride (PVF). More particularly the invention comprises a process for dehydrochlorination or dehydrofluorination of PVC and PVF at low temperature. The polymers are treated with alkali metal amide in liquid ammonia solution until dehydrochlorination (or dehydrofluorination) is substantially complete, resulting in microporous carbons of desirable molecular sieve properties.

"Saran" active carbons are usually prepared by the pyrolytic dehydrochlorination of PVC in vacuo. The complete removal of HCl usually requires heating to final temperatures of 750° C. or more. The microporous structure of the resulting carbons depends to a large extent on the rate of heating. When the temperature rises rapidly above 150–200° C. the PVC usually melts, bubbles are formed and the resulting carbon may have little or no adsorptive properties i.e. have a very small surface area. When the temperature of the PVC is allowed to rise very slowly during the initial carbonization process (several days or weeks) carbons of very high surface areas can be obtained. Depending on details of the pyrolytic process such carbons may have marked molecular sieve properties.

It has now been found that the dehydrohalogenation action of alkali metal amide in liquid ammonia solution on PVC (or PVF) leads to microporous carbons having molecular sieve properties. The dehydrohalogenation appears to be complete after about 1–4 or more hours, depending mainly on the thickness of the polymer. It is desirable that the polymer be in powder, thin disk or sheet form with most of the polymer less than about 1 mm. from the solid-liquid interface.

The amide may be lithium, sodium or potassium amide and is generally used in stoichiometric excess to aid completion of the reaction. Liquid ammonia may be used at or below its boiling point (−33° at 1 atm.) or under pressure at temperatures up to about room temperature (at 140 p.s.i. boiling point is 25.7° C.).

Any vinylic hydrocarbon polymer having a ratio of hydrogen to chlorine (or fluorine) of about one is operative in the present process. Polyvinylidene chloride is preferred since it is readily dehydrochlorinated at low temperatures according to the invention to give a molecular sieve of very uniform pore size. It is preferred that the polymer be in powder or thin film form and that the system be stirred well—to give uniform and complete dehydrohalogenation in a reasonable time. If the reaction proceeds too quickly, the structure may fissure or crack and the desired porous structure not be obtained. Suitable adjustment of temperature, pressure, agitation, concentration of amide, and polymer thickness or surface area can be made to give a desired reaction rate.

EXAMPLE

"Saran" PVC (in substantially pure form i.e. without additives) was obtained from Dow Chemical Company, Sarnia, Ontario, Canada, and introduced into a stirred solution of $KNH_2$ (10–15% in excess of stoichiometric for reaction with the H and Cl of the polymer) in liquid ammonia (at −33° C., and 1 atm.). Reaction started immediately with the PVC turning black while a transient blue color appeared in the solution. When the brisk reaction had ceased (after 1–2 hours with polymer in the form of a wafer about 1 mm. thick), the excess $KNH_2$ was destroyed by addition of $NH_4Cl$. The supernatant liquid was syphoned off and the residue washed with liquid ammonia. The excess ammonia was allowed to evaporate and the residual carbon washed with warm water until no chloride could be detected in the washings (by $AgNO_3$ test). The carbon was dried by heating in vacuo to about 300° C. for 1–2 hours. The weight of residual carbon was close to theoretical. A final heating to 500° C. or more in vacuo may be needed to remove last traces of impurities.

A typical carbon product which had been given a final heat treatment to 500° C. in vacuo for several hours had the following adsorptive properties.

TABLE

| Nitrogen: | BET surface areas, m.$^2$/gm. |
|---|---|
| ($\sigma_m$ 16.2 A.) | 530 |
| ($\sigma_m$ Based on liquid density) | 488 |
| Propane ($\sigma_m$ based on liquid density, 25° C.) | 381 |
| n-Butane ($\sigma_m$ based on liquid density, 25° C.) | 295 |
| Isobutane ($\sigma_m$ based on liquid density, 25° C.) | 84 |
| Neopentane ($\sigma_m$ based on liquid density, 25° C.) | 4 |

There was very little adsorption of $CCl_4$. Water adsorption was $x/m = 0.17$ at $p/p_0 = 75\%$, with little or no hysteresis.

Thin unsupported flat sheets of "Saran" carbon are difficult if not impossible to obtain by pyrolytic methods. Thin PVC or PVF sheets supported by macroporous rigid layers of sintered glass, porous porcelain etc. can be treated with alkali metal amide in liquid ammonia solution and after washing and evacuation, molecular sieves of relatively high and specific permeabilities obtained. The products are also useful as adsorbents, catalyst base, fuel cell electrode etc.

We claim:
1. A process of dehydrohalogenating halogenated vinylic hydrocarbon polymer having a ratio of hydrogen to chlorine or fluorine of about one, to form microporous carbon, comprising contacting the polymer with a liquid ammonia solution of an amide of an alkali metal from the group lithium, sodium and potassium.
2. The process of claim 1 wherein the polymer is in a form such that most of it is less than about 1 mm. from the solid-liquid interface.
3. The process of claim 1 wherein the solution is at approximately the boiling point of ammonia at atmospheric pressure.
4. The process of claim 1 wherein the polymer is polyvinylidene chloride.
5. The process of claim 1 wherein the polymer is polyvinylidene fluoride.
6. The process of claim 1 wherein a stoichiometric excess of alkali metal amide is used.
7. The process of claim 1 wherein the solution is stirred uniformly during the reaction.
8. The process of claim 1 wherein the reaction rate is adjusted to give the desired uniform porous structure.

9. The process of claim 2 wherein polyvinylidene chloride in thin sheets or powdered form is contacted with a stirred solution of a stoichiometric excess of potassium amide in liquid ammonia at its boiling point at atmospheric pressure for about 1 to 4 hours and a carbon molecular sieve of uniform porous structure recovered.

References Cited

UNITED STATES PATENTS 3,258,363   6/1966   Lieb _____ 136—121 X

OTHER REFERENCES

Dubinin: "Proceedings of the Fifth Conference on Carbon," vol. 1, 1962, pp. 81–87.

EDWARD J. MEROS, Primary Examiner

U.S. Cl. X.R.

23—209.2; 252—421; 264—29